United States Patent [19]

Fink

[11] Patent Number: 5,120,435
[45] Date of Patent: Jun. 9, 1992

[54] PRE-TREATMENT SEWER DISCHARGE SYSTEM

[76] Inventor: Ronald G. Fink, 3875 Fiscal Ct., Ste. 200, West Palm Beach, Fla. 33404

[21] Appl. No.: 652,190

[22] Filed: Jan. 30, 1991

[51] Int. Cl.$^5$ .............. C02F 1/38; C02F 1/40; C02F 1/42; C02F 1/78
[52] U.S. Cl. .................. 210/192; 210/206; 210/220; 210/259; 210/265; 210/266; 210/290; 210/314; 210/316; 210/502.1; 210/512.1; 210/521; 261/5; 422/292
[58] Field of Search .............. 210/192, 206, 220, 259, 210/265, 266, 290, 314, 316, 502.1, 512.1, 521; 261/5, DIG. 42; 422/24, 28, 292, 305

[56] References Cited

U.S. PATENT DOCUMENTS 3,545,619 12/1970 Ettlich ........................ 210/265
3,748,262 7/1973 Hanju Lee et al. ............ 210/192
4,859,329 8/1989 Fink ............................ 210/314

*Primary Examiner*—W. Gary Jones
*Attorney, Agent, or Firm*—Malin, Haley, McHale, DiMaggio & Crosby

[57] ABSTRACT

A system for purifying water is provided having a series of filtering systems connected in series in a predetermined order along a flow path of the water to be purified. The filtering systems used in the invention include air striping, aeration, gravity separation, inclined plate coalescing separation, diffused air floatation, metallic oil attraction, static solid separation, hydrocarbon adsorption and absorption, chemical flocking, ozone, and coalescing centrifugal separation. The combination and relative order of placement of these filtering system acheives an improved filtering result.

20 Claims, 2 Drawing Sheets

PRE-TREATMENT SEWER DISCHARGE SYSTEM

BACKGROUND OF THE INVENTION

1. Field of the Invention

The invention relates to a system for pre-treating water prior to discharging it into a sewer system and more particularly to a system which removes organic and inorganic pollutants from a waste stream prior to discharging the treated water into a sewer system by a series of filtering systems.

2. Description of Related Art

It has long been recognized that there is a need to remove contaminants and pollutants from water used in such applications as mechanical or industrial processes, before returning the water to a sewer system. In many cases standards have been developed by government agencies such as the Environmental Protection Agency which set the types and amounts of materials which are allowed to be discharged. Many diverse filtering systems have therefore been created to treat waste water meet these standards. An example of such a system for removing oil, grease and fuel from water is disclosed in the applicant's U.S. Pat. No. 4,859,329, issued Aug. 22, 1989. However, these individual filtering systems have not been effectively combined to use their respective filtering systems to treat a wide variety of contaminants and pollutants. In particular, these filtering systems have not been combined in a synergistic way to produce an extremely effective filtering system for filtering virtually any contaminant or pollutant likely to be encountered.

SUMMARY OF THE INVENTION

The instant invention combines the following filter systems: air striping, aeration, gravity separation, inclined plate coalescing separation, diffused air floatation, metallic oil attraction, static solid separation, hydrocarbon adsorbtion and absorption, chemical flocking, ozone, and coalescing centrifugal separation. Tests have shown that the instant invention combining the aforementioned filtering systems, removes the following compounds from waste water by the percentages indicated: FOG (fats, oils, and grease) 99.5%, fuel oil 98%, turbidity 86%, BOD 98%, gasoline 94%, TSS 83%, COD 85%, lead 95%, foaming agents 55%, silver 89%, cadmium 72%, arsenic 83%, and zinc 80%. The spectrum of compounds removed and the efficiency with which they are removed has heretofore been unattainable with the prior art systems.

It is an object of the instant invention to combine a plurality of filtering systems in such a way that the filtering properties of the system as a whole exceed the sum of each filtering system individually.

It is another object of the instant invention to provide a filtering system which effectively removes a wide variety of the compounds likely to be encountered in waste water.

It is another object of the instant invention to combine a plurality of filtering systems into a single, comparatively compact unit.

It is yet another object of the instant invention to provide an economical filtering system which combines a plurality of what had previously been discrete filtering systems.

These and other objects of the instant invention will become clear from the following description.

Having thus briefly described the instant invention, the invention will be described in detail with particular reference to the accompanying drawings where like elements are referred to by like numerals.

DETAILED DESCRIPTION OF THE INVENTION

Figure 1:
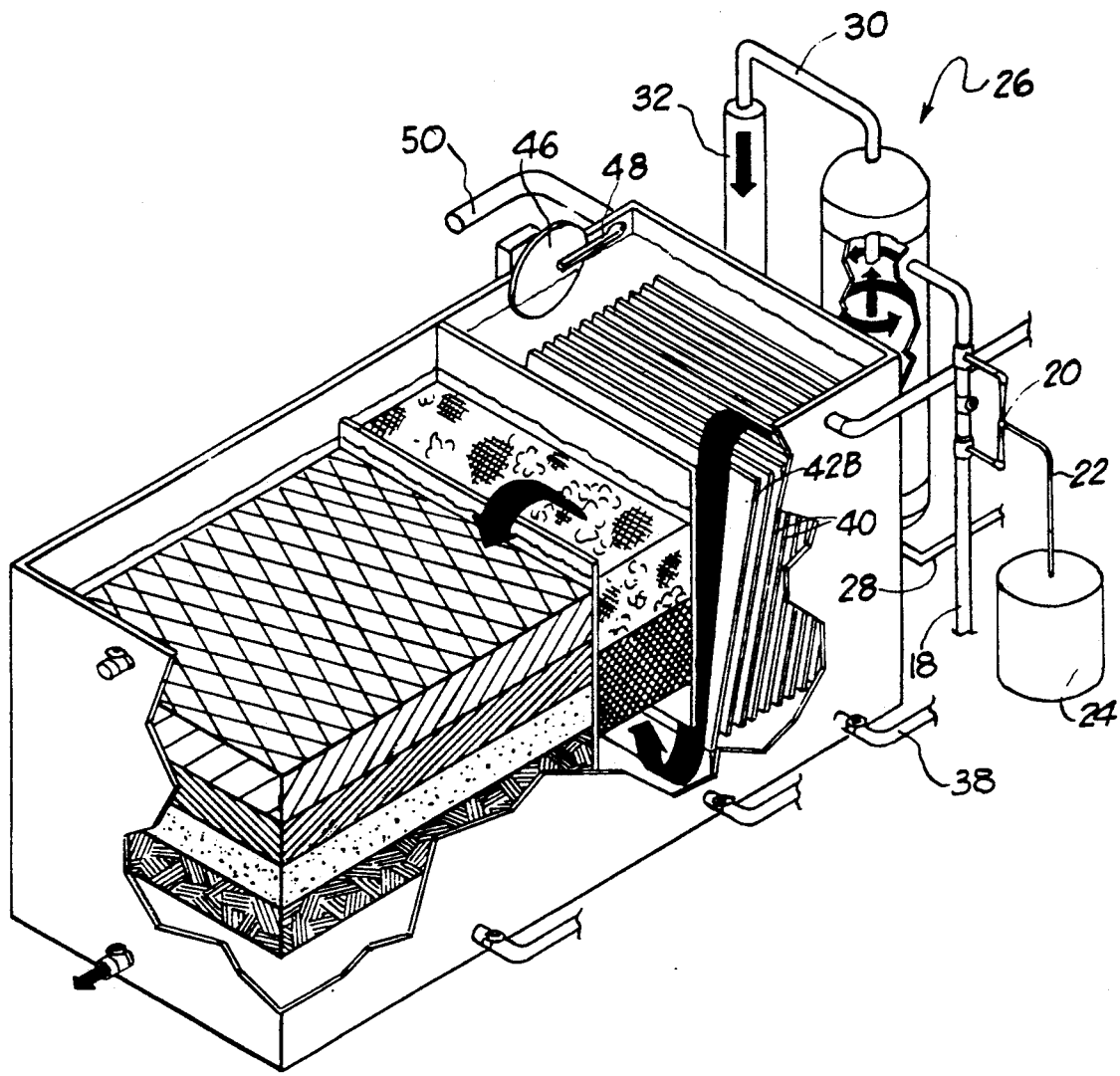
FIG. 1 is a cut-away perspective view of the invention.

Referring to FIG. 1, the invention is generally shown labelled 10. Waste water to be processed by the invention 10 is brought from a sump (not shown) to the invention 10 through input tube 18. Water within input tube 18 may be pressurized through gravity or through the insertion of a pump intermediate the invention 10 and the sump.

Attached to input tube 18 is syphon 20. A syphon tube 22 extends from syphon 20 into a chemical container 24 containing chemicals which may be applied to the water in input tube 18. Syphon 20 is of the venturi type which draws chemicals from within chemical container 24 through syphon tube 22 into input tube 18. The chemicals within chemical container 24 may be used to pretreat the water, for example killing bacteria. Chlorine based chemicals are ideally suited for this application. In addition, or in the alternative, chemicals may be added to the water through syphon 20 containing a flocking agent which causes certain materials in the water to flock together.

Input tube 18 enters a centrifugal separator 26 which performs three functions: solids, including those created by the flocking chemical and particularly heavy solids, are separated from the water; hydrocarbons move to the center where they coalesce; and, the chemicals introduced into the water through syphon 20 are flash mixed with the water to further aid in the flocking or chlorination process. Preferably, the centrifugal separator is made according to the teachings of the applicant's U.S. Pat. No. 4,859,329, issued Aug. 22, 1989.

Briefly described, centrifugal separator 26 is an elongated tube where water from input tube 18 enters the top of centrifugal separator 26 at an angle. Water entering centrifugal separator 26 at an angle causes the water to move in a spiral, swirling fashion. The solids and heavier particles move to the outer edges of centrifugal separator 26 by centrifugal force. There, under the force of gravity, they settle to the bottom of centrifugal separator 26. Thereafter, these settled particles may be removed from centrifugal separator 26 through centrifugal separator return tube 28 which carries a water mixture which is highly concentrated with the separated particles back to the sump where the settled particles are deposited for later removal.

A centrifugal outlet tube 30 extends from within centrifugal separator 26 outward. Centrifugal outlet tube 30 is comprised of a polypropylene material which is oliophonic and therefore attracts oil and light hydrocarbons. As a result of the centrifugal separation process, the heavy elements are moved to the outside of the centrifugal separator 26 as explained above, and the oil and light hydrocarbons move to the inside where they are removed through centrifugal outlet tube 30.

The swirling motion within centrifugal separator 26 assists the chemicals inserted through syphon 20 in mixing with the water within centrifugal separator 26. This mixing is known as "flash mixing". The "flash mixing" aspect of centrifugal separator 26 eliminates the need for a propellor or other mechanical mixing structure to mix the chemicals with the water as had been previously required.

Although centrifugal outlet tube 30 is preferably made of polypropylene, an oliophonic material, it may also be made of other oliophonic materials such as that sold under the trademark TEFLON. However, polypropylene is preferred because it is less expensive to purchase and more readily available. Throughout this specification, when oliophonic material is mentioned, particularly polypropylene, it is clear that TEFLON or other oliophonic materials may be used in place of or in addition to the polypropylene.

Although a specific separator, a centrifugal separator 26, has been described as used in the preferred embodiment, any other type of separator which performs the following functions may be substituted: separate solids; coalesce oils and light hydrocarbons; and, mix the chemicals, particularly the flocking chemicals, injected from the syphon 20 with the water. This substitute separator may be a unit device or may be a series of separate devices performing the described functions.

After the water has been treated within centrifugal separator 26, it travels through centrifugal outlet tube 30 to an aeration tube 32. Aeration tube 32 adds intrained air into the water. Aeration tube 32 performs three purposes. First, aerated water kills algae. Secondly, the aeration tube provides dissolved air floatation (DAF), a known water treatment system. DAF aids in separating contaminants because some by-products of the flocking process float to the surface while others settle as a result of the DAF process. Thereafter, the flocking by-products that either float or settle may be appropriately removed from the aeration tube 32 by outlet tubes placed at the top and bottom of aeration tube 32.

Finally, the aeration tube 32 performs the function of an air stripper whereby light hydrocarbons such as gasoline are moved to the top of aeration tube 32 where they may evaporate to the air through the top of aeration tube 32. Typically, the volume of such hydrocarbons is small thereby avoiding a problem of emitting noxious fumes or chemicals. However, should the invention 10 be used in an environment where a substantial amount of light hydrocarbons are produced, an activated carbon air filter such as is common in the art, may be attached to the top of aeration tube 32 to filter the hydrocarbons before being admitted to the outside air.

Figure 2:
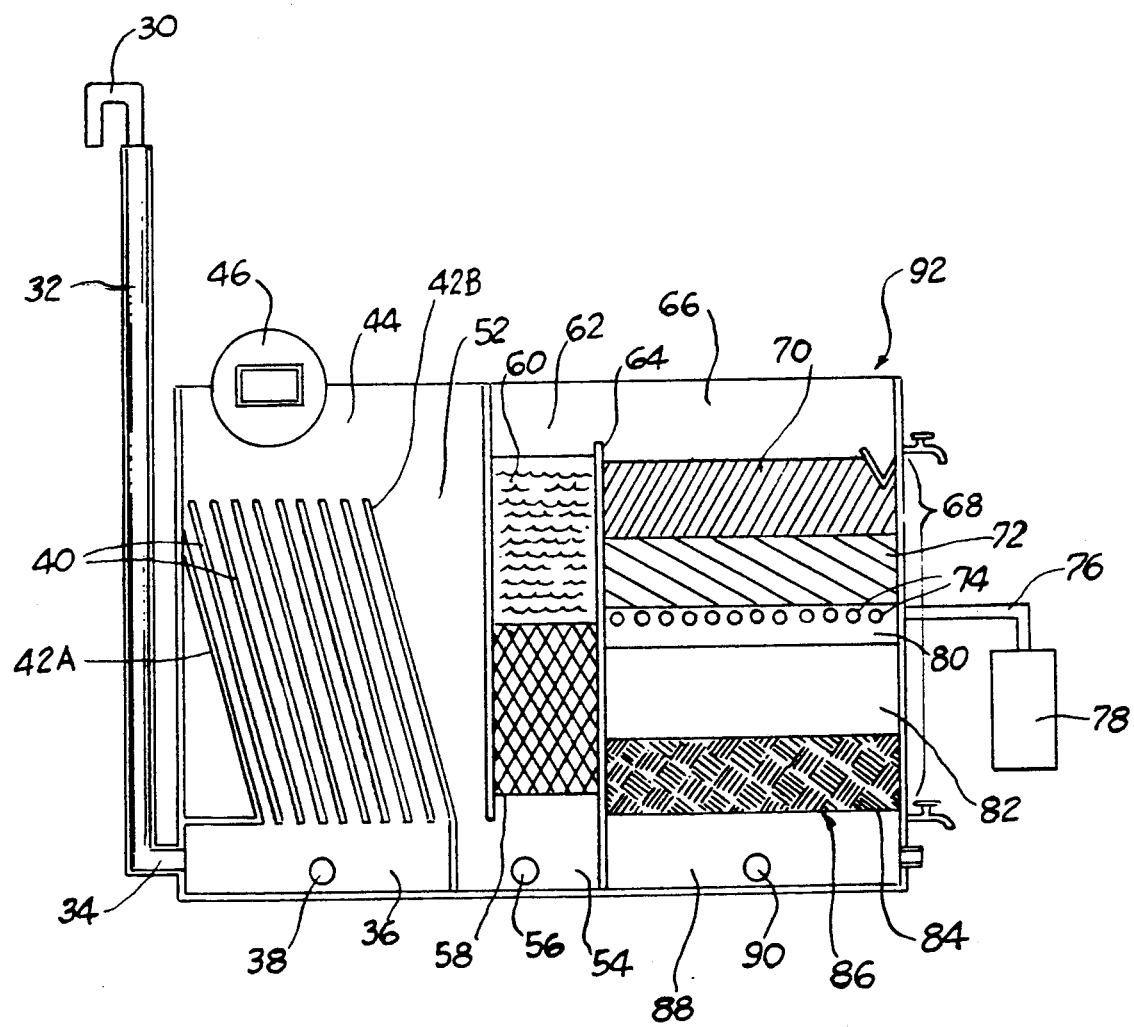
FIG. 2 is a schematic side view of the invention of FIG. 1.

As best seen in FIG. 2, the water that is passed through aeration tube 32 passes into lower inclined plate reservoir 36 through aeration outlet tube 34. Some solids and flocking byproducts will settle out of lower incline plate reservoir 3 where they may be removed to the sump through lower inclined plate reservoir outlet tube 38.

Located above lower incline plate reservoir 36 are a pair of flow directors 42A, B. Flow directors 42A, B direct the flow of water from lower incline plate reservoir 36 through a series of parallel inclined plates 40. The incline plates 40 are preferably made of polypropylene. The purpose of inclined plates 40 is to further separate the solids and oils from the water. The incline plates 40 are placed parallel to each other at a 60° angle to the horizon. This 60° is the angle of recluse of the inclined plates 40.

The inclined plates 40 perform several functions. First, because the plates are inclined, they slow down the water traveling between flow directors 42A, B due to friction. Because the water is slowed down, it is easier for the solids to fall by gravity out of the water where they will fall on to the top of one of the incline plates 40 and slide downward into lower incline plate reservoir 36. Further, because oil has a natural buoyancy in water and because polypropylene attracts oil, oil particles will tend to move toward the underside of the incline plates 40. There, the buoyancy of the oil particles, as well as inducement from water flowing between flow directors 42A and B, will cause small particles of oil to move upward along the bottom surfaces of inclined plates 40.

As the oil particles move upward, they will "bump" into each other thereby coalescing into larger oil particles. The larger oil particles are more buoyant than the smaller oil particles. This buoyancy causes the oil particles to rise to the top of inclined plates 40 into upper inclined plate reservoir 44. In addition, intrained air bubbles from aerator 32 still present in the water as it travels between flow directors 42A, B also "bumps" the oil particles together on the underside of incline plates 40, thereby helping the smaller oil particles to coalesce into larger, more buoyant oil particles.

It has been found that most of the flocking process by-products as well as suspended solids down to 30 parts per million are removed from the water by the time the passes to the upper inclined plate reservoir 44, located above inclined plates 40.

The oil, which has been coalesced into larger oil drops, and which is moved to the top of upper inclined plate reservoir 44 collects into a layer of oil along the top of upper inclined plate reservoir 44. An oil wheel 46 is used to remove this oil. The oil wheel 46 comprises a rotating disk 47 of oliophonic material, preferably polypropylene, whose axis of rotation is parallel to the surface of upper inclined plate reservoir 44. The lower edge of disk is placed a small distance into the water of upper inclined plate reservoir 44. Due to the oil coalescing and separation of inclined plates 40, the water in upper inclined plate reservoir 44 has an upper layer of oil. Oil is attracted to the oliophonic material of disk 47 where it is lifted out of the water by the rotation of disk 47. Thereafter, as shown in FIG. 1, a scraper 48, in contact with disk 47, removes the oil from disk 47 and allows the oil to flow through oil drain tube 50 into a collecting container.

Disk 47 is preferably made of polypropylene, but in an alternate embodiment, an aluminum wheel with a TEFLON coating could be used. The disadvantage of using aluminum in this context is that aluminum is susceptible to deterioration by any detergents which may be present in the water.

Water from upper inclined plate reservoir 44 moves downward through intermediate flow path 52 into lower intermediate reservoir 54. Any remaining particulate or flocking by-products may settle to the bottom of lower intermediate reservoir 54. A lower intermediate reservoir outlet 56 is provided to move these sediments back to the sump where they may be removed.

The flow path of water through lower intermediate reservoir 54 continues through static solid separator 58. Static solid separator 58 comprises a series of screens each made of polystyrene, polypropylene, and polyethylene or a combination of these which all have the property of statically attracting particles. This static particle attraction leads to adsorption which causes particles to be added to the surface of the screens.

The screens of the different materials mentioned above are arranged to cause a resistance to the water, thereby slowing the water through static separator 58. Because the water slows down, turbulence decreases allowing particles which are naturally attractive to combine thereby becoming heavier. These heavier particles fall into lower intermediate reservoir 54 where they may be removed by lower intermediate reservoir outlet tube 56. Also, the reduction in turbulence resulting from the slow moving water facilitates the attraction between the particles and the screens containing the polystyrene, polypropylene, polyethylene material. Typically ten to twelve screens are arranged in series The screens have variable hole sizes ranging from about $\frac{1}{4}''$ to 1/32" in diameter. The screens are arranged so that the screens with the larger diameter holes are encountered first in the water flow path while the screens with the smaller diameter holes are encountered later along the flow path.

The static separator 58 can be cleaned, when needed, by removing it from the invention 10 and by passing water under pressure through it in a reverse direction to the functional flow path thereby dislodging the particles attracted to the surface of the plastic screens.

Located above and further down the flow path from static separator 58 is hydrocarbon absorption filter 60. Hydrocarbon adsorption filter 60 is preferably constructed of a polmericisocyanate material which is foam-like. This foam absorbs hydrocarbons by fine capillary action in the foam. Hydrocarbon absorption filter 60 is particularly effective in removing lighter hydrocarbons and mechanically emulsified chemicals. When hydrocarbon absorption filter 60 becomes ineffective due to its capillaries being plugged by the trapped hydrocarbons and emulsified materials, hydrocarbon absorption filter 60 must be replaced.

Water exits hydrocarbon absorption filter 60 and enters upper intermediate reservoir 62. A dam 64 provides one edge for upper intermediate reservoir 62. When the water level within upper intermediate reservoir 62 raises above the height of the dam 64, the water flows over the dam 64 into upper filter bed reservoir 66 which lies above the composite multimedia filter bed shown at 68 in FIG. 2.

Multimedia filter bed 68 comprises a series of horizontally distributed filtering material. The first of these filtering materials is filter aggregate 70 which is a pumice material. Because the pumice has sharp edges and small capillaries, a combination of capillary attraction and interaction with the sharp edges of the pumice traps particles, especially remaining flocking process by-product particles, within filter aggregate 70. Therefore, filter aggregate 70 is a solid particle removing filter.

Located below filter aggregate 70 is an unactivated carbon filter 72. The unactivated carbon is pure anthracite coal which adsorbs hydrocarbons such as benzene by surface attraction. The adsorbed hydrocarbons are physically deposited on the outside surface of the anthracite. Because unactivated carbon has a smooth, shiny surface, the surface cannot get functionally "blinded" by having capillaries on its surface plugged with the attracted material. This property of unactivated carbon is in contradistinction to activated carbon which, because of its capillary covered surface, is particularly susceptible to "blinding".

Aeration hoses 74 are placed immediately below the unactivated carbon filter 72. Aeration hoses 74 are hoses manufactured of a porous material to allow gas within the hoses 74 to pass out of hoses 74 along its length in macroscopic sized bubbles. Aeration hoses 74 are attached at one end to a header tube 76 which is in turn attached to an ozone generator 78. Ozone generator 78 generates ozone which is injected through header tube 76 into aeration hoses 74 at about ten pounds per square inch pressure. The ozone then passes out of aeration hoses 74 where, due to its natural buoyancy in water, the ozone moves upward through unactivated carbon filter 72 and filter aggregate 70.

Because the ozone is moving upward, which is in the opposite direction to the flow of water through the multimedia filter 68, the upward movement of ozone slows down the water thereby facilitating greater mixing of the ozone with the water. Further, the ozone particles bump into the particulate matter which has been adsorbed by unactivated carbon filter 72 and trapped by filter aggregate 71. This "bumping" carries these particles into upper filter bed reservoir 68 where it can be removed through upper filter bed reservoir outlet tube 67.

Further, it is textbook theory that ozone performs two important water treatment functions. First, ozone kills bacteria and algae. Further, ozone oxidizes the organic material which attracted to and adsorbed onto the carbon of unactivated carbon filter 72. The oxidizing of this organic material produces carbon dioxide which moves upward through unactivated carbon filter 72 and filter aggregate 70 where it is released harmlessly out the top of the invention 10.

Located below the bubble tubes 74 is the activated aluminum filter 80. The activated aluminum filter 80 is an ion exchange resin which has a strong affinity for heavy metals such as lead, mercury, and cadmium, to name but a few. This affinity is due to cationic and anionactic attractions which result in these heavy metals being adsorbed onto the surface of the ion exchange resin.

Activated aluminum filter 80 is preferably used in the invention 10, although it may be omitted if the water to be treated has few heavy metals.

An activated carbon filter 82 is placed below activated aluminum filter 80. In contrast to the unactivated carbon filter 72, the activated carbon has a large surface area per volume of carbon and has correspondingly many capillary spaces. This surface area and capillary structure allows the activated carbon to filter by absorbtion any leftover particulate matter which may have found its way through the invention. As such, it acts as a final "polish" filter.

A volcanic rock layer 84, where each rock typically has a cross sectional diameter of about one inch, is placed below the activated carbon filter 82 on a grate 86. The primary purpose of the volcanic rock layer 84 is to support the filter layers above it. However, the volcanic rock layer 84 also has a great deal of capillary structure which can trap minute pieces of carbon which may have made their way through the other elements of multimedia filter bed 68.

Water which emerges from the multimedia bed filter bed 68 enters into lower filter bed reservoir 88 where it may be removed through lower filter bed reservoir outlet tube 90.

The multimedia filter bed 68 may be cleaned by backflushing water through the filter bed thereby causing the water to flow in a reverse direction to the normal water flow pattern. The water under pressure may flow upward through the multimedia bed 68 whereupon it will enter the upper filter bed reservoir 66. Then, the water within upper filter bed reservoir 66, containing any backflushed particles, may be returned to the sump through upper filter bed reservoir outlet tube 67.

Lower and upper inclined plate reservoirs 36, 44, incline plates 40, oil wheel 46, intermediate flow path 52, lower and upper intermediate reservoirs 54, 62, static solid separator 58, hydrocarbon absorption filter 60, upper and lower filter bed reservoirs 66, 88 and multimedia filter bed 68 are all contained within a tank 92 which is preferably made of fiberglas. In the preferred embodiment, tank 92 is a single layer tank. However, a stronger tank 92, which would be correspondingly more resistant to any chemicals which may be present in the water flowing through the invention 10 and to physical damage, may be made by placing a first fiberglas tank within a second fiberglas tank and then vacuum gluing the tanks together by techniques uniquely used in the industry. This embodiment of tank 92 has found particular acceptance where the material to be filtered is particularly dangerous or the consequences of damage to the tank 92 could be grievous. In an alternate embodiment, tank 92 may be made of stainless steel.

Having thus described the instant invention in connection with specific embodiments, it is to be understood that the description has been given by means of example only and not for limitation. It is to be further understood that changes, additions or modifications can be made to the description given herein and still be within the scope of the invention. Further, obvious changes and modifications will occur to those skilled in the art.

What I claim is:

1. A system for purifying water, comprising, in series along a flow path of said water:
   (a) a first separator for separating solids from light hydrocarbons and coalescing light hydrocarbons and oils;
   (b) an aerator means for killing algae and for providing dissolved air floatation and gravitational separation of particulates and for stripping light hydrocarbons from the water;
   (c) an inclined plate separator for further separating solids from light hydrocarbons and oils and for coalescing said light hydrocarbons and oils;
   (d) an oil wheel for removing oil;
   (e) a static solid separator for slowing the flow of water through said static solid separator and for removing particles by gravitational separation and by attractive adsorbtion onto the surface of said static solid separator;
   (f) a hydrocarbon absorption filter for filtering light hydrocarbons; and,
   (g) a final filter for removing solid particulates and light hydrocarbons.

2. The system of claim further comprising a syphon, located before said first separator on the flow path of said water, for injecting chemicals from a chemical container into said water before said water enters said first separator whereby chemicals including chlorinating chemicals and flocking chemicals may be injected into said water.

3. The system of claim 1, wherein said first separator comprises a centrifugal separator.

4. The system of claim 1, wherein said inclined plates are made of an oliophonic material.

5. The system of claim 4, Wherein said inclined plates comprise a plurality of spaced plates inclined at an angle of 60° to the horizon.

6. The system of claim 1, Wherein said oil wheel comprises a disk made of oliophonic material located above said inclined plate separator so that a portion of said disk is adapted to extend into an oil layer formed above said water by the separation of oil from the water in said inclined plate separator, said oil wheel further comprising means for rotating said oil wheel about an axis parallel to the surface of said water, and further comprising means for removing oil, attracted to said oliophonic material of said disk, from said disk.

7. The system of claim 6, wherein said means for removing said oil from said disk comprises a scraper in contact with said disk and a collection tube whereby said scraper mechanically removes oil from said disk by physical contact between the oil to be removed and said scraper whereupon said oil is directed to said collection tube.

8. The system of claim 1, wherein said final filter comprises a plurality of layers of horizontally distributed filtering material, each of said layers arranged perpendicular to said flow path of said water so that said water must pass through each of said horizontally distributed filtering materials progressively along said flow path.

9. The system of claim 8, wherein said horizontally distributed filtering material comprise:
   a first layer of pumice material for removing solid particles;
   a second layer of unactivated carbon for adsorbing hydrocarbons by surface attraction;
   an activated carbon filter layer; and
   a volcanic rock layer.

10. The system of claim 9, further comprising an activated aluminum filter for removing heavy metals by cationic and anionic attraction.

11. The system of claim 8, further comprising an ozone injector system located below said unactivated carbon filter layer, said ozone injection system comprising a plurality of horizontally disposed aeration hoses manufactured of a gas permeable material, said aeration hoses attached to an ozone generator for generating ozone under pressure whereby said pressurized ozone enters said aeration hoses from said ozone generator and exits said aeration hoses, through said gas permeable material, below said unactivated carbon filter layer whereby said ozone travels up through said unactivated carbon filter by the natural buoyant tendency of ozone in the water thereby interacting with said water and said deposits on said unactivated carbon filter elements.

12. The system of claim 1 wherein said static solid separator comprises a plurality of oliophonic screens arranged to slow said water as said water passes through said static solid separator.

13. The system of claim 12 wherein said plurality of screens have varying diameters of hole sizes comprising said screen, said screens having the larger diameters of hole sizes placed first along said water flow path while said screens having the smaller diameter hole sizes placed last along said water flow path.

14. The system of claim 13 wherein the diameter of holes in said screens varies from about ¼" to 1/32".

15. The system of claim 1 wherein said hydrocarbon absorption filter comprises a polmericisocyanate foam.

16. The system of claim 15 wherein said polmericisocyanate foam is an expanded polmericisocyanate foam.

17. A system for purifying water, comprising, in series along a flow path of said water:
 (a) a first separator for separating solids from light hydrocarbons and oils and coalescing light hydrocarbons and oils comprising a centrifugal separator;
 (b) an aerator for killing algae and for providing dissolved air floatation and gravitational separation of particulates;
 (c) an inclined plate separator for further separating solids from light hydrocarbons and oils and for coalescing said light hydrocarbons and oils wherein said inclined plates comprise a plurality of spaced plates made of an oliophonic material and wherein said flow path of said water through said inclined plate separator is from the bottom to the top of said inclined plate separator;
 (d) an oil wheel for removing oil comprising a disk made of oliophonic material located above said inclined plate separator so that a portion of said disk is adapted to extend into an oil layer formed above said water by the separation of oil from said water in said inclined plate separator, said oil wheel further comprising means for rotating said oil wheel about an axis parallel to the surface of said water, and further comprising means for removing oil, attracted to said oliophonic material of said disk, from said disk;
 (e) a static solid separator for slowing the flow of water through said static solid separator and for removing particles by gravitational separation and by attractive adsorbtion onto the surface of said static solid separator comprising a plurality of oliophonic screens arranged to slow said water as said water passes through said static solid separator;
 (f) a hydrocarbon absorption filter for filtering light hydrocarbons comprising a polmericisocyanate foam;
 (g) a final filter for removing solid particulates and light hydrocarbons comprising a plurality of layers of horizontally distributed filtering material, each of said layers arranged perpendicular to said flow path of said water so that said water must pass through each of said horizontally distributed filtering materials progressively along said flow path, said horizontally distributed filtering material comprising:
 a first layer of pumice material for removing solid particles;
 a second layer of unactivated carbon for adsorbing hydrocarbons by surface attraction;
 an activated aluminum filter for removing heavy metals by cationic and anionic attraction;
 an activated carbon filter layer; and,
 a volcanic rock layer;
 said final filter further comprising an ozone injector system located below said unactivated carbon filter layer, said ozone injection system comprising a plurality of horizontally disposed aeration hoses manufactured of a gas permeable material, said aeration hoses attached to an ozone generator for generating ozone under pressure whereby said pressurized ozone enters said aeration hoses from said ozone generator and exits said aeration hoses through said gas permeable material below said unactivated carbon filter layer whereby said ozone travels up through said unactivated carbon filter by the natural buoyant tendency of ozone in the water thereby interacting with said water and said deposits on said unactivated carbon filter elements.

18. The system of claim 17, wherein said inclined plates are inclined at an angle of 60° to the horizon.

19. The system of claim 17, wherein said means for removing said oil from said disk comprises a scraper in contact with said disk and a collection tube whereby said mechanical scraper mechanically removes oil from said disk by physical contact between the oil to be removed and said scraper whereupon said oil is directed to said collection tube.

20. A system for purifying water, comprising, in series along a flow path of said water:
 (a) a first separator for separating solids from light hydrocarbons and oil and coalescing light hydrocarbons and oil comprising a centrifugal separator;
 (b) an aerator for killing algae and for providing dissolved air floatation and gravitational separation of particulates;
 (c) an inclined plate separator for further separating solids from light hydrocarbons and oils and for coalescing said light hydrocarbons and oils wherein said inclined plates comprise a plurality of spaced plates made of an oliophonic material and inclined at an angle of 60° to the horizon and wherein said flow path of said water through said inclined plate separator is from the bottom to the top of said inclined plate separator; and
 (d) an oil wheel for removing oil comprising a disk made of oliophonic material located above said inclined plate separator so that a portion of said disk is adapted to extend into an oil layer formed above said water by the separation of oil from said water in said inclined plate separator, said oil wheel further comprising means for rotating said oil wheel about an axis parallel to the surface of said water, and further comprising means for removing oil, attracted to said oliophonic material of said disk, from said disk comprising a scraper in contact with said disk and a collection tube whereby said scraper mechanically removes oil from said disk by physical contact between the oil to be removed and said scraper whereupon said oil is directed to said collection tube;
 (e) a static solid separator for slowing the flow of water through said static solid separator and for removing particles by gravitational separation and by attractive adsorbtion onto the surface of said static solid separator comprising a plurality of oliophonic screens arranged to slow said water as said water passes through said static solid separator;
 (f) a hydrocarbon absorption filter for filtering light hydrocarbons comprising a polmericisocyanate foam;
 (g) a final filter for removing solid particulates and light hydrocarbons comprising a plurality of layers of horizontally distributed filtering material, each of said layers arranged perpendicular to said flow path of said water so that said water must pass through each of said horizontally distributed filtering materials progressively along said flow path, said horizontally distributed filtering material comprising:

a first layer of pumice material for removing solid particles;

a second layer of unactivated carbon for adsorbing hydrocarbons by surface attraction;

an activated aluminum filter for removing heavy metals by cationic and anionic attraction;

an activated carbon filter layer; and, a volcanic rock layer;

said final filter further comprising an ozone injector system located below said unactivated carbon filter layer, said ozone injection system comprising a plurality of horizontally disposed aeration hoses manufactured of a gas permeable material, said aeration hoses attached to an ozone generator for generating ozone under pressure whereby said pressurized ozone enters said aeration hoses from said ozone generator and exits said aeration hoses through said plurality of openings below said unactivated carbon filter layer whereby said ozone travels up through said unactivated carbon filter by the natural buoyant tendency of ozone in the water thereby interacting with said water and said deposits on said unactivated carbon filter elements.

\* \* \* \* \*